(12) United States Patent  (10) Patent No.: US 8,913,215 B2
Yang et al.  (45) Date of Patent: Dec. 16, 2014

(54) BISTABLE SWITCHABLE LIQUID CRYSTAL WINDOW

(75) Inventors: Deng-Ke Yang, Hudson, OH (US); Lei Shi, Kent, OH (US); Rui Bao, Wuhan (CN)

(73) Assignee: Kent State University, Kent, OH (US)

( * ) Notice: Subject to any disclaimer, the term of this patent is extended or adjusted under 35 U.S.C. 154(b) by 1371 days.

(21) Appl. No.: 12/410,156

(22) Filed: Mar. 24, 2009

(65) Prior Publication Data

US 2009/0290078 A1 Nov. 26, 2009

Related U.S. Application Data

(60) Provisional application No. 61/038,816, filed on Mar. 24, 2008.

(51) Int. Cl.
*G02F 1/137* (2006.01)
*G02F 1/1333* (2006.01)
*G02F 1/1335* (2006.01)
*G02F 1/1341* (2006.01)

(52) U.S. Cl.
CPC .. *G02F 1/13718* (2013.01); *G02F 2001/13775* (2013.01)
USPC .......... 349/92; 349/16; 349/35; 349/189

(58) Field of Classification Search
USPC ......................... 349/16, 35, 92, 189
See application file for complete search history.

(56) References Cited

U.S. PATENT DOCUMENTS

| 4,946,263 | A | * | 8/1990 | Vaz et al. ......... 349/34 |
| 5,345,322 | A | * | 9/1994 | Fergason ......... 349/79 |
| 5,691,795 | A | | 11/1997 | Doane et al. |
| 5,847,798 | A | | 12/1998 | Yang et al. |
| 6,061,107 | A | | 5/2000 | Yang et al. |
| 6,096,392 | A | * | 8/2000 | Nishio ......... 428/1.1 |
| 6,540,938 | B1 | * | 4/2003 | Afzali-Arkadani et al. ......... 252/299.01 |
| 7,023,600 | B2 | | 4/2006 | Mallya et al. |
| 2003/0193709 | A1 | * | 10/2003 | Mallya et al. ......... 359/245 |
| 2007/0222915 | A1 | * | 9/2007 | Niioka et al. ......... 349/62 |

FOREIGN PATENT DOCUMENTS

| JP | 2007-017461 | 1/2007 |
| WO | 02-08825 | 1/2002 |
| WO | 2004-051357 | 6/2004 |

OTHER PUBLICATIONS

International Search Report/Written Opinion for corresponding PCT International Application No. PCT/US09/38086 mailed Jan. 12, 2010.

* cited by examiner

*Primary Examiner* — Jerry Blevins
(74) *Attorney, Agent, or Firm* — Hahn Loeser + Parks LLP

(57) ABSTRACT

A bistable switchable liquid crystal device is provided in which the device can be switched between a transparent and an opaque state by a predetermined voltage pulse. The device is based on polymer stabilized cholesteric materials. No additional amount of voltage has to be applied to the device in order to sustain the optical states. Therefore, the device is energy-saving.

41 Claims, 13 Drawing Sheets

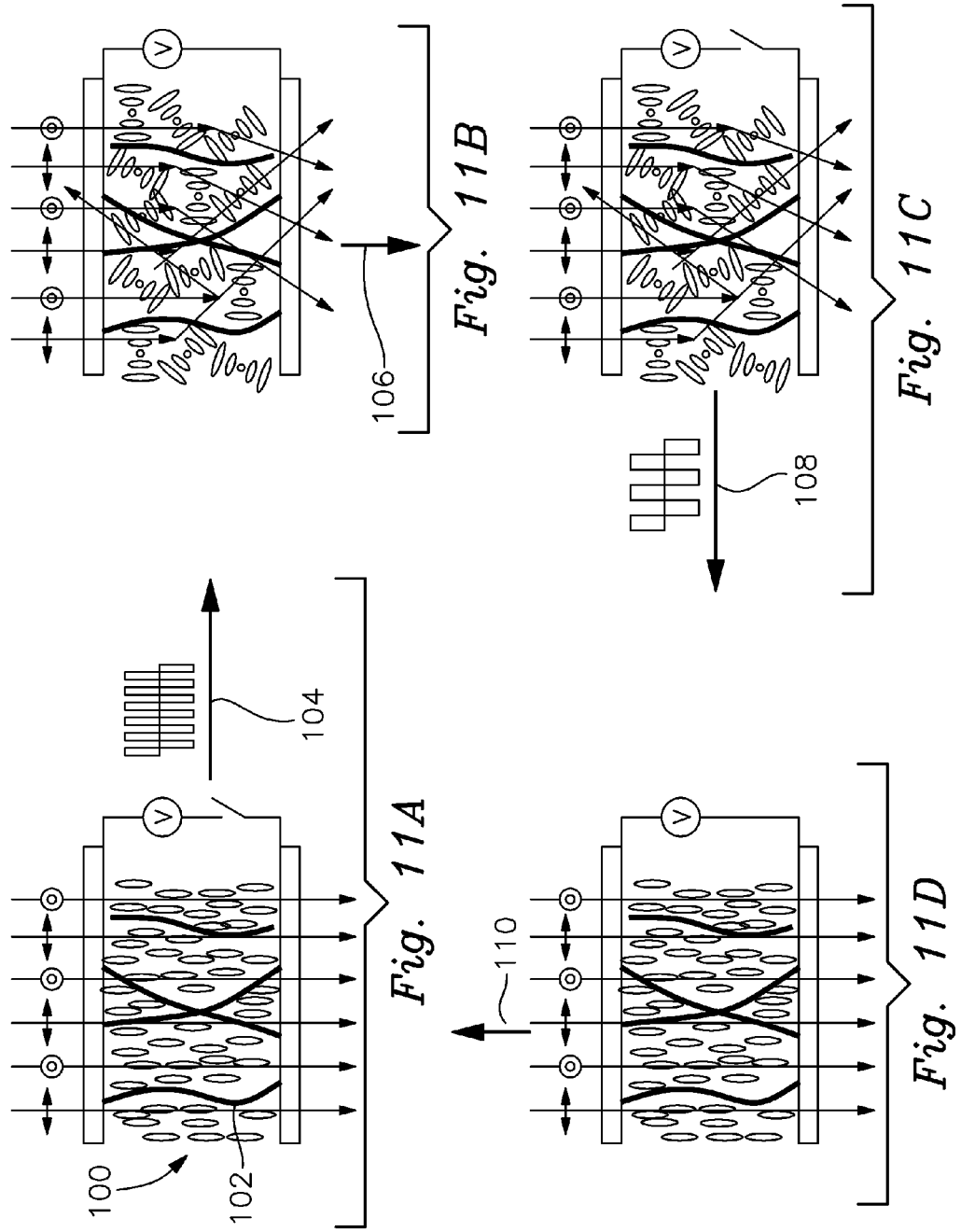

BISTABLE SWITCHABLE LIQUID CRYSTAL WINDOW

CROSS REFERENCE TO RELATED APPLICATION

This patent application claims priority to U.S. Provisional Application No. 61/038,816 filed on Mar. 24, 2008, which is hereby incorporated by reference.

TECHNICAL FIELD

The invention relates to a bistable switchable liquid crystal window. More particularly, the invention relates to bistable switchable liquid crystal window that is switchable between a transparent state and a scattering state, with these states remaining stable at zero field.

BACKGROUND OF THE INVENTION

Efforts have been made to optimize the manner in which one can control electromagnetic radiation passing through a window, e.g., in residences, commercial buildings, automobiles, etc. Such control may be to provide privacy, reduce glare from ambient sunlight, or to control harmful effects of ultraviolet light. Technology associated with such light control has evolved significantly over the conventional window shade or blind.

One approach to electromagnetic radiation control uses passive films, such as high reflectivity films, heat saving films, and fade-protection films. However, such films generally result in a constant reduction in interior light and loss in visibility. Another approach uses glass panels having radiation transmission characteristics that absorb infrared and ultraviolet wavelengths, while transmitting visible wavelengths.

Further approaches to electromagnetic radiation control use "smart window" technology, wherein light transmission characteristics may be electrically controlled in order to meet lighting needs, minimize thermal load on heating and/or cooling systems, provide privacy within interior spaces of buildings, vehicles and the like, or control harmful effects associated with ultraviolet light exposure.

There are two general categories of chromogenic switchable glazing or smart windows, namely: non-electrically activated switchable glazings and electrically activated switchable glazings. The non-electrically activated types of chromogenic switchable glazing are based on photochromics, thermochromics and thermotropics. The most common electrically activated types of chromogenic switchable glazing are based on polymer dispersed liquid crystals (PDLC), dispersed particle systems (DPS) and electrochromics.

In general, PDLC technology involves phase separation of nematic liquid crystal from a homogeneous liquid crystal containing an amount of polymer. The phase separation can be realized by polymerization of the polymer. The phase separated nematic liquid crystal forms micro-sized droplets dispersed in the polymer bed. In the off-state, the liquid crystal molecules within the droplets are randomly oriented, resulting in mismatching of the refractive indexes between the polymer bed and the liquid crystal droplets and hence a translucent or light scattering state. When a suitable electric field is applied, the liquid crystal orients such that the refractive indexes between the polymer bed and the liquid crystal droplets are oriented such that a transparent state results. The main disadvantage of the PDLC technology is the inherent haze caused by the optical index mismatching, particularly at large viewing angles. The application of an applied voltage is also necessary to resistance stability.

Electro-optical laminate structures having total-reflection, semi-transparent and totally transparent modes of operation for improved control over the flow of electromagnetic radiation have been developed. Such structures comprise one or more cholesteric liquid crystal (CLC) electromagnetic radiation polarizing panels, also known as polymer stabilized cholesteric texture (PSCT) liquid crystal technology.

PSCT polarizers are used in light valves and electro-optical glazing, or smart window constructions to control light. Such constructions typically comprise two rigid sheets of glass on either side of the CLC layer. The CLC layer comprises crosslinkable or polymerizable material mixed with non-crosslinkable liquid crystals and chiral dopants. Each sheet of glass is covered with a transparent, electrically conductive coating to which electrical connections are attached. The structure is typically mounted within a frame.

PSCT generally may be formed in "normal" mode, "reverse" mode, or bistable mode. In the normal mode, the liquid crystals are in a focal conic state and scatter light. If an electric field is applied to the liquid crystal, the liquid crystals reorient themselves parallel to each other along with the electric field and the panel appears transparent, allowing light to pass through the device without scattering of the light.

"Reverse mode" PSCT is similar to the normal mode PSCT product, but with some key differences. The liquid crystal panel is transparent at zero field and scattering/opaque when a sufficiently high field is applied. Further, an additional orientation layer is generally applied to the substrates before lamination of the liquid crystal mixture. During curing of the panel, which is typically slower than for normal mode product, no electric field is applied to the mixture. Also, the formulation is a modified liquid crystal mixture, and includes higher polymer concentration. Reverse mode PSCT are particularly suitable for automotive type applications when a fail-safe state must be transparent. It is also preferred for use when the main duty of the glazing structure is to act as a transparent window.

Bistable PSCT systems operate in a different manner, whereby a voltage is applied to switch from a scattering/opaque state to a transparent state, and vice versa. At one voltage condition, the material is opaque or optically scattering, because the liquid crystal is randomly oriented throughout the system, and thus the refractive indices vary spatially. At another voltage condition, the material is transparent, because the liquid crystal is uniformly aligned and the material becomes an optically uniform medium. Although liquid crystals are dielectric media, their conductivities are not zero because of impurities. Switchable windows prepared with PDLCs and PSCTs consume generous amounts of energy since a voltage must be applied in order to sustain one of the optical states. Thus, current liquid crystal switchable windows have a problem in that voltage must be applied to sustain one of the optical states, namely, they are monostable.

Therefore, there remains a need for improved bistable switchable liquid crystal windows switchable between an optically transparent state, upon exposure with a predetermined voltage pulse, and an optically scattered state, upon exposure to an elevated temperature, and which remains stable in either state at zero field.

SUMMARY OF THE INVENTION

In general, one aspect is to provide a bistable switchable liquid crystal device. The device includes a first transparent substrate having an interior and exterior surface, a second transparent substrate having an interior and exterior surface, wherein the first and second substrates are separated by a predetermined distance. The device also includes an electrically conductive layer located on the interior surface of each of the first and second substrates, a liquid crystal material comprising at least one nematic liquid crystal material, and a polymer matrix comprising at least one chiral material, at least one polymerizable monomer and a photo-initiator, wherein the liquid crystal material is contained within and between the electrically conductive layers of the first and second transparent substrates, and wherein the liquid crystal material of the polymer matrix is switchable to an optically transparent homeotropic state upon application of an electric field and an optically scattering focal conic state upon application of a further electric field or an elevated temperature. These states are maintained at zero field.

Another aspect is to provide a method of preparing a bistable switchable liquid crystal device. The method includes the steps of providing a mixture comprising at least one liquid crystal material, at least one chiral dopant, at least one polymerizable monomer, and a photo-initiator, dissolving the mixture in a solvent to form a solution, introducing the solution into a cell comprising a first and second transparent substrates, wherein each of the substrates has an interior and exterior surface and an electrically conductive layer is located on the interior surface of each of the first and second substrates, and curing the mixture under ultraviolet radiation in the presence of an external electric field, wherein application of the electric field aligns the at least one liquid crystal material of the mixture in an optically transparent homeotropic state after polymerization.

In another aspect, there is provided a bistable switchable liquid crystal device comprising a first transparent substrate having an interior and exterior surface, a second transparent substrate having an interior and exterior surface, with the first and second substrates being separated by a predetermined distance. An electrically conductive layer is located on the interior surface of each of the first and second substrates. A liquid crystal material comprising at least one nematic liquid crystal material, and a polymer matrix comprising at least one chiral material, at least one polymerizable monomer and a photo-initiator, disposed within and between the electrically conductive layers of the first and second transparent substrates. The liquid crystal material is a dual frequency cholesteric liquid crystal, and is switchable to an optically transparent homeotropic state upon application of an electric field of a first frequency, and an optically scattering focal conic state upon application of an electric field of a second frequency, where the first and second frequencies are different.

There is also provided a method of preparing a bistable switchable liquid crystal device, including the steps of providing a mixture comprising at least one dual frequency cholesteric liquid crystal, at least one polymerizable monomer, and a photo-initiator, and dissolving the mixture in a solvent to form a solution. The solution is introduced into a cell comprising a first and second transparent substrate, wherein at least one of the substrates has an electrically conductive layer located on the interior surface thereof. The solution is cured, such as by UV irradiation or other suitable manner, in the presence of an external electric field, wherein application of the electric field aligns the liquid crystal material in the substrate normal direction. Other methods of initially aligning the liquid crystal material may be used. The monomer forms a polymer network along the substrate normal direction, which has an aligning and confining effect on the liquid crystal material after the polymerization. The polymer network is formed to tend to align the liquid crystal parallel to it.

After polymerization, when the applied voltage is turned off, the liquid crystal remains in the homeotropic texture, because of the aligning and confining effects of the polymer network. In this state, the liquid crystal is parallel to the polymer network and the PSCT material is transparent. When a sufficiently high voltage of high frequency is applied across the two substrates, the liquid crystal has a negative dielectric anisotropy and is tilted away from the substrate normal direction. The material is switched to the poly-domain state wherein the PSCT material becomes scattering. When the applied high frequency voltage is turned off from this state, the material remains in the scattering state due to intermolecular interaction between the liquid crystal molecules which favors the twist state. In this state, the orientation of the liquid crystal is random with respect to the polymer network and the polymer network cannot unwind the twist structure of the liquid crystal, and therefore cannot align the liquid crystal parallel to it. When a sufficiently high voltage of low frequency is applied across the two substrates, the liquid crystal has a positive dielectric anisotropy and the twist structure of the liquid crystal is unwound, with the liquid crystal aligned parallel to the substrate normal direction. The material is thus switched to the homeotropic state and the PSCT material becomes transparent. When the applied low frequency voltage is turned off from this state, the material remains in the transparent state in a stable condition.

These and other advantages and novel features, as well as details of an illustrated embodiment of the present invention, will be more fully understood from the following description and drawings.

BRIEF DESCRIPTION OF THE DRAWINGS

FIGS. 11a-11d shows schematic diagrams of the operation of an alternative bistable switchable LC window configuration according to the invention;

DETAILED DESCRIPTION OF THE INVENTION

In one embodiment of the invention, a bistable switchable liquid crystal device, such as may be used in a window type of application, is disclosed that can be switched between a transparent state and a light scattered state by a voltage pulse. No further amount of voltage to the device is required in order to maintain either the transparent state of the light scattering state. Therefore, the device is energy-saving and efficient and effective in use.

Figure 1:
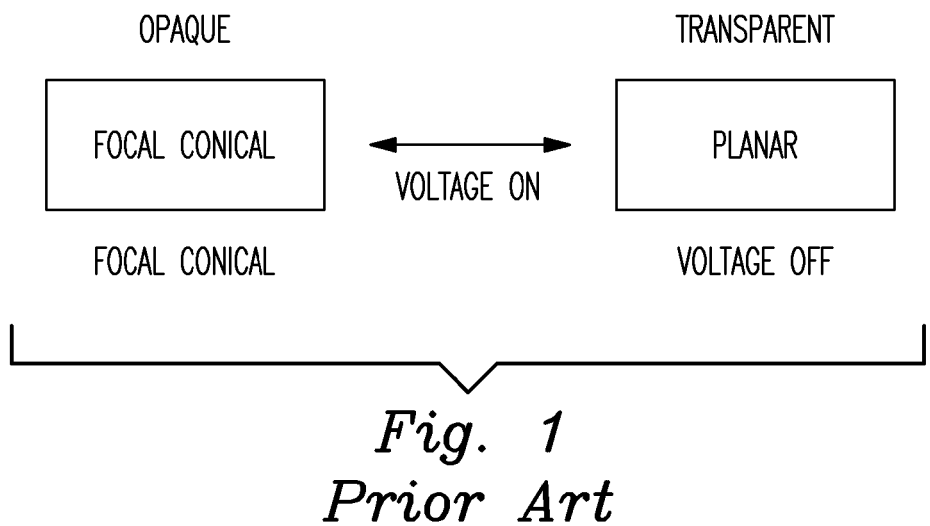
FIG. 1 is a prior art diagram illustrating electrical switching of an electro-optical device between focal conic and planar texture.

The device includes structures that are electrically switched between an opaque state and a transparent state. Typically, in the opaque state, the CLC molecules scatter light because the helically twisted molecules have randomly oriented axes. This is known as a focal conical state or texture. Furthermore, in the transparent state, the CLC molecules are aligned parallel to the substrate. No reflecting or scattering of light in the visible spectrum occurs. This is known as a planar state or texture. A prior art liquid crystal device is shown in FIG. 1. Here, the CLC molecules are switched from the focal conic texture to the planar texture by applying an electric field to the CLC molecules. The planar structure is somewhat stable, but degrades when the electric field is removed. By applying an electric field to the CLC molecules in the planar texture, the CLC molecules are switched back to the focal conical texture.

Figure 2:
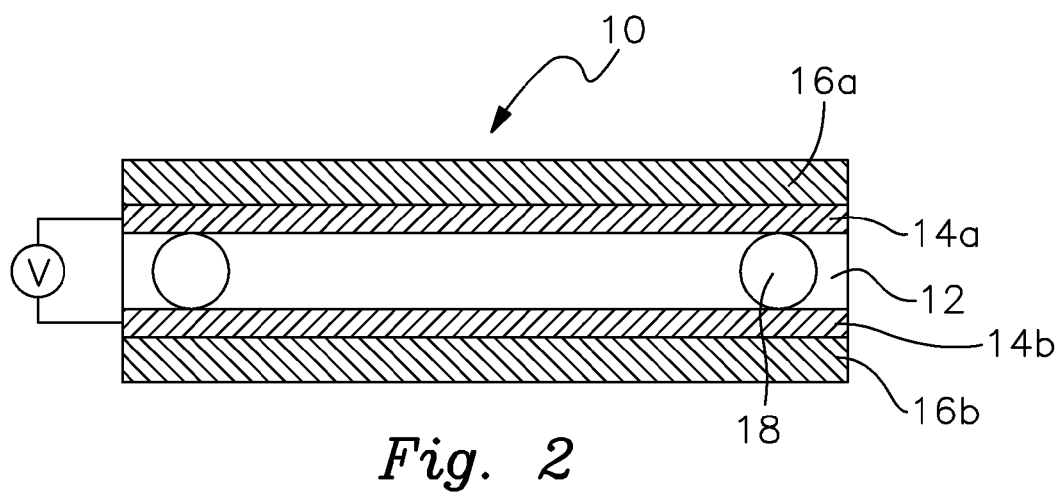
FIG. 2 is a cross section of a first embodiment of a display cell for a switchable liquid crystal window.

Referring to FIG. 2, the illustrative first embodiment of the electro-optical structure of the invention will be described. The electro-optical structure 10 generally comprises a CLC material 12 interposed between a pair of optically-transparent electrically-conductive layers 14a and 14b supported upon a pair of spaced-apart transparent substrates 16a and 16b, each substrate having an interior and exterior surface, respectively, the perimeter edges of which are sealed, and across which a voltage is applied under the control of a microcontroller (not shown). As used herein the term "transparent" means that the film does not absorb a significant amount visible radiation and does not reflect a significant amount of visible radiation, rather, it is transparent to visible radiation. A plurality of spacers 18 may be included within CLC material 12 to separate and maintain the space between the optically transparent electrically-conductive layers 14a and 14b.

The transparent electrically conductive layers 14a and 14b may comprise indium tin oxide (ITO), silver, zinc oxide or other optically transparent conductive polymer or like film coating. Chemical vacuum deposition, chemical vapor deposition, evaporation, sputtering, or other suitable coating techniques may be used for applying the conductive layers 14a and 14b to the transparent substrates 16a and 16b. In some examples, providing a conductive layer on at least one of the substrates may be sufficient.

Examples of transparent substrates 16a and 16b include polymer films. The polymer films include films made of polyolefin, polyester, polyvinyl chloride, polyvinyl fluoride, polyvinylidene difluoride, polyvinylidene chloride, polyacrylate, polycarbonate, polyurethane, etc., and combinations thereof. In one embodiment, the flexible films comprise PET films. The transparent substrates 16a and 16b may also include glass panels and rigid polymeric films.

Electrical leads are attached to the conductive layers 14a and 14b. A voltage source is shown connected to the conductive layers in order to switch the CLC layer between different optical states by application of an electric field pulse. The voltage source may be an AC voltage source or a DC-AC inverter and a battery. In addition, the switching power may be supplied by a photovoltaic device that converts solar power to electrical power.

In an example, the CLC material 12 comprises nematic liquid crystals and a chiral dopant. The CLC material may also include a polymer matrix formed from at least one chiral material, at least one polymerizable monomer and a photo-initiator. The polymer matrix stabilizes or supports the nematic liquid crystals. The polymer matrix has characteristics to facilitate maintaining stability of both the light transmitting and light scattering states without a field applied after switching between the states. The characteristics relate to forming a polymer network where microdomains of liquid crystal material are dispersed between the network. The microdomains include liquid crystals that tend to be aligned with the polymer networks extending between the substrates 16a and 16b as shown. This favors the transparent homeotropic state due to the aligning and confining effect of the polymer network, facilitating maintaining this condition until being switched to the light scattering state. Upon switching to the light scattering state, the pitch of the cholesteric liquid crystal creates intermolecular interaction between liquid crystal molecules which favors maintaining the light scattering poly-domain state, without applied voltage. In this way, the bistability of the system is achieved.

In an embodiment, the CLC material 12 comprises a polymer matrix having nematic liquid crystals stabilized or supported therein. The polymer matrix is generally formed by polymerization or crosslinking of at least one polymerizable monomer or crosslinkable polymer with non-reactive nematic liquid crystals, and a chiral additive. Polymerization of the liquid crystal mixture is initialized in any suitable manner, as by UV radiation, thermally, etc., depending upon the polymer used.

The cholesteric liquid crystal material may include at least about 90.0% by weight nematic liquid crystal material, at least about 3.0 by weight of chiral dopant material and at least about 0.5% by weight photo-initiator.

In one embodiment, the polymer matrix is formed from crosslinking a mixture of a crosslinkable monomer(s), a non-crosslinkable liquid crystal(s) and chiral dopant(s). A liquid crystal polymer stabilized cholesteric texture (PSCT) is formed when a small amount of a UV crosslinkable polymer in its liquid crystal phase and a photoinitiator are mixed with a cholesteric liquid crystal (CLC) whose pitch is tuned to the infrared region. The crosslinkable monomer concentration is typically greater than about 5.0% by weight of the total CLC mixture. The mixture is then cured by exposure to UV light while a voltage or a magnetic field is applied to align the liquid crystal as well as the polymer molecules in the direction across the device thickness, forming the poly-domain structure of microdomains of liquid crystal molecules. With the field applied during curing, the CLC molecules are aligned in a planar texture (transparent) after the curing.

Particularly useful polymerizable materials include acrylate and methacrylate monomers. Examples of suitable photopolymerizable monomers include acrylic acid and methacrylic acid, esters thereof, each of which contains an alkyl group, an aryl group, or a cycloalkyl group including three or more carbon atoms, and halides thereof. Such photocurable monomers are, for example, isobutyl acrylate, stearyl acrylate, lauryl acrylate, isoamyl acrylate, 2-ethylhexyl acrylate, n-butyl methacrylate, n-lauryl methacrylate, tridecyl methacrylate; n-stearyl methacrylate, n-cyclohexyl methacrylate, benzyl methacrylate, isobornyl methacrylate, 2-phenoxyethyl methacrylate, 2,2,3,4,4,4-hexafluorobutyl methacrylate, 2,2,3,4,4,4-hexachlorobutyl methacrylate, 2,2,3,3-tetrachloropropyl methacrylate, 2,2,3,3-tetrachloropropyl methacrylate, perfluorooctylethyl methacrylate, perfluorooctylethyl acrylate, and perchlorooctylethyl methacrylate. Polyfunctional compounds may also be used. Polyfunctional compounds are, for example, ethylene glycol dimethacrylate, bisphenol-A diacrylate, bisphenol-A dimethacrylate, 1,4-butanediol dimethacrylate, 1,6-hexanediol dimethacrylate, trimethylolpropane triacrylate, and tetramethylolmethane tetraacrylate. Other monomers include mono-functional monomer SK (Liquid Crystal Institute and Kent State University) and bi-functional monomer SK (Liquid Crystal Institute and Kent State University). Such monomers and polyfunctional compounds may be used independently or in a combination of two or more.

In one embodiment, the cholesteric liquid crystal material comprises at least about 90% by weight of a nematic liquid crystal material, at least about 3.0% by weight of a chiral material and at least about 3.0% by weight of a mono-functional monomer and at least about 3.0% by weight of a bi-functional monomer.

Useful photoinitiators include benzoin methyl ether, as well as other photoinitiators known to those in art.

The process for making the bistable switchable liquid crystal device includes the steps of (a) providing two transparent substrates coated with a transparent conductive layer, wherein the substrates are separated by spacers to create an area between the substrates (b) depositing a cholesteric liquid crystal (CLC) mixture containing a polymerizable monomer in the area between the substrates, (c) sealing the perimeter of the transparent substrates to contain the CLC mixture with the monomer within the area between the substrates and (d) polymerizing the monomer.

In an example, transparent substrates 16a and 16b are coated with ITO and heated to remove moisture. The ITO coated-surface of one of the substrates is then separated with spacers 18. The liquid crystal-monomer mixture is then deposited onto at least one of the substrates. The second transparent substrate is contacted with the first substrate so that the liquid crystal-monomer mixture contacts conductive layer 14a and/or 14b on each of transparent substrate 16a and 16b.

In another embodiment, spacers are included in the CLC mixture and are applied to the transparent substrate when the CLC material is coat deposited or coated onto the substrate.

The CLC material can be coated onto the conductive film by any known method suitable for coating liquid materials. For example, the CLC material may be applied to the conductive film by gravure coating, curtain coating, die-coating, printing and screen printing.

The matrix 12 is prepared by polymerizing the liquid crystal-monomer mixture either in zero electric field or in an electric field effective to align the liquid crystal directors. In one embodiment, matrix 12 is prepared by mixing a cholesteric liquid crystal with an amount of a reactive monomer. Next, a thin film of the mixture is placed between a pair of conducting layers, wherein the monomer is then allowed to react while an applied electric field is supplied.

Figure 3:
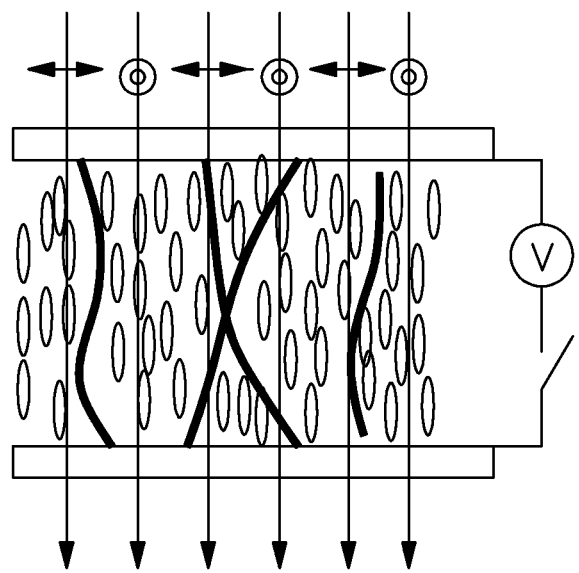
FIG. 3 is a cross section of a first embodiment of a display cell showing the transparent state of a bistable polymer stabilized cholesteric texture material used for switchable windows.
Figure 4:
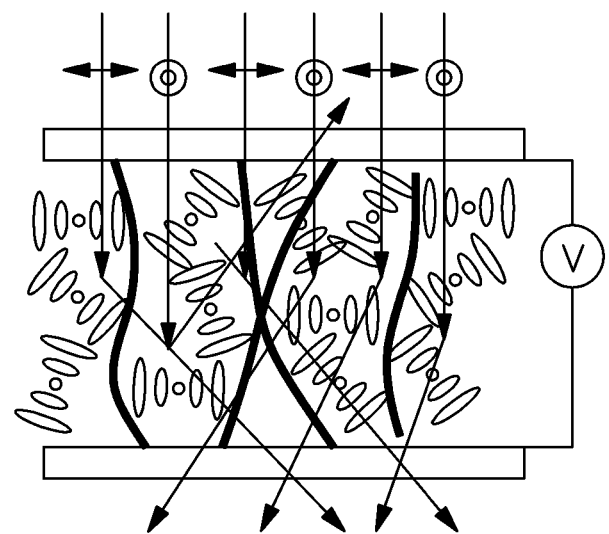
FIG. 4 is a cross section of a first embodiment of a display cell showing the opaque state of a bistable polymer stabilized cholesteric texture material used for switchable windows.

The transparent state is the homeotropic state where the liquid crystal material is uniformly aligned in the cell normal direction as shown in FIG. 3. The scattering state is the focal conic state where the liquid crystal exists in a randomly oriented polymer domains as shown in FIG. 4. With proper polymer networks, both homeotropic and focal conic states are stabilized at zero field. The liquid crystal used exhibits dual dielectric anisotropies. For an applied low frequency AC electric field, for example at 100 Hz, the dielectric anisotropy is positive and the liquid crystal tends to be parallel to the applied field. For a high frequency AC electric field, for example at 10 kHz, the dielectric anisotropy is negative and the liquid crystal tends to be perpendicular to the applied field. Therefore, application of a low frequency voltage pulse switches the PCST to the transparent homeotropic state while application of a high frequency pulse switches the material to the scattering focal conic state.

Figure 5A:
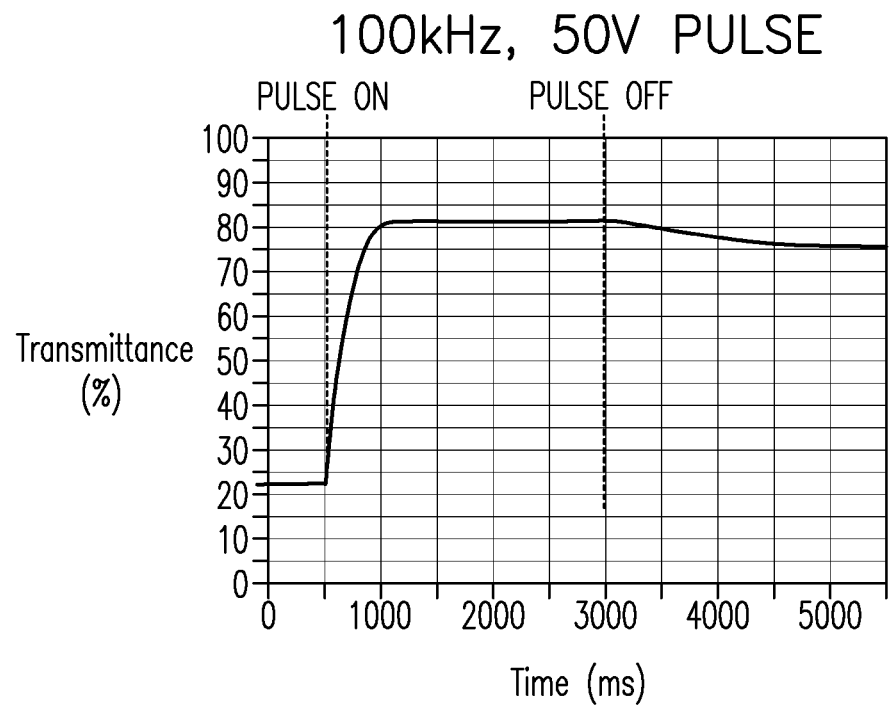
FIG. 5a is a response of a first embodiment of the bistable switchable liquid crystal window to a low frequency voltage pulse.
Figure 5B:
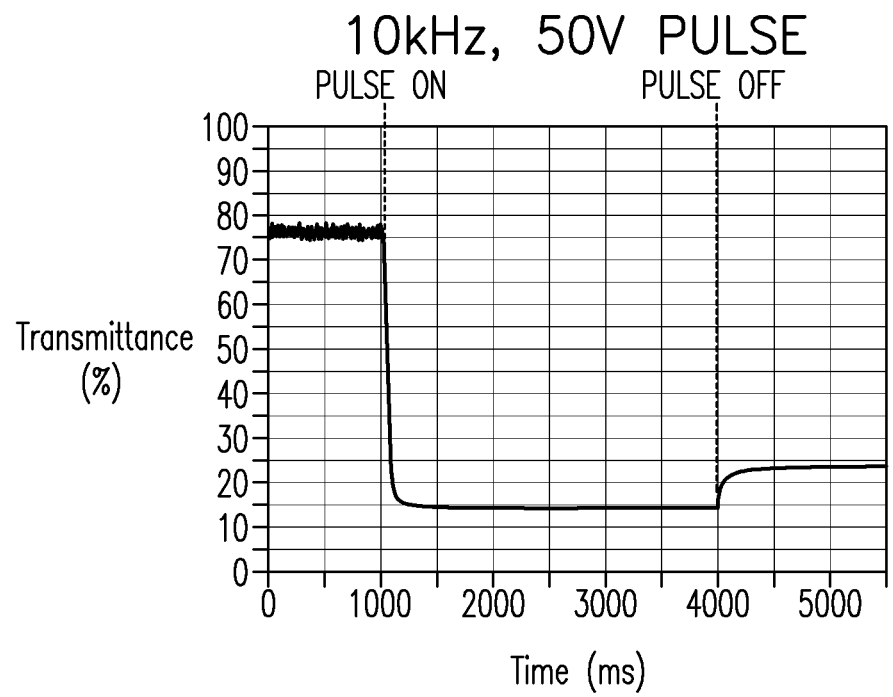
FIG. 5b is a response of a first embodiment of the bistable switchable liquid crystal window to a high frequency voltage pulse.

The response of the PSCT window to a low frequency voltage pulse that switches the window from a scattering state to a transparent state can be seen in FIG. 5a. The response of the PSCT window to a high frequency voltage pulse that switches the window from the transparent state to the scattering state can be seen in FIG. 5b.

In one embodiment, the bistable switchable liquid crystal window device is prepared by mixing the following materials:

60.2% by weight nematic liquid crystal EK1360718 (Acros);

30.0% by weight nematic liquid crystal ZLI4330 (Merck);

0.55% by weight chiral dopant CB15 (Merck);

1.16% by weight chiral dopant R811 (Merck);

0.39% by weight chiral dopant R1011 (Merck);

3.00% by weight mono-functional monomer SK (LCI, KSU);

3.00% by weight bi-functional monomer SK (LCI, KSU); and 0.50% by weight benzoin methyl ether (Polysciences, Inc.)

The mixture is then dissolved in a compatible organic solvent to form a solution. The solution is then introduced into a 10 micron thickness cell that includes two parallel glass substrates with ITO electrodes. The mixture in the cell is cured under UV irradiation in the presence of an external electric field to form the bistable switchable liquid crystal window device.

Figure 6A:
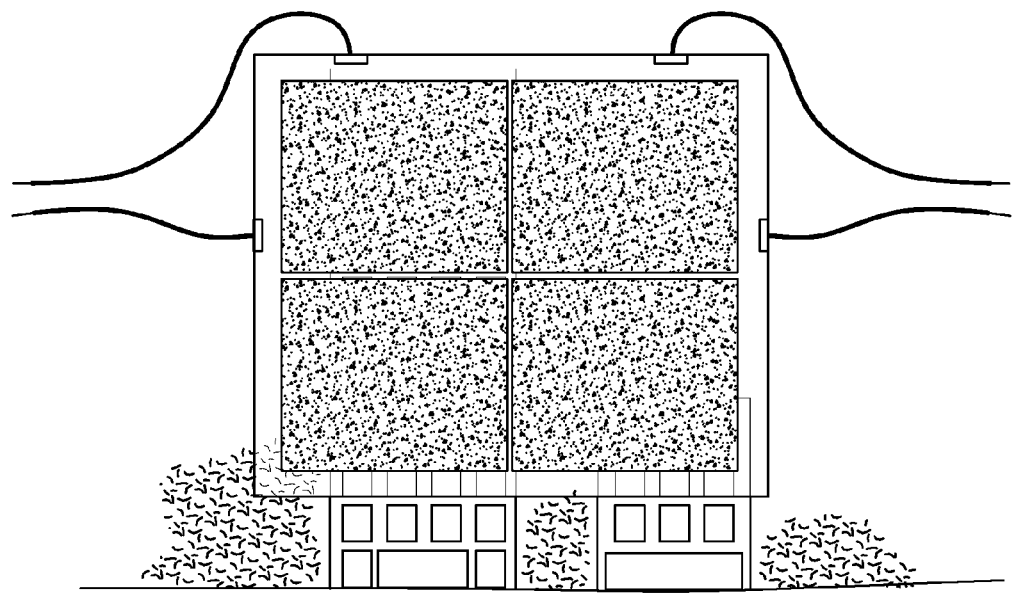
FIGS. 6a-6d shows examples of a first embodiment of the bistable switchable liquid crystal window.
Figure 6B:
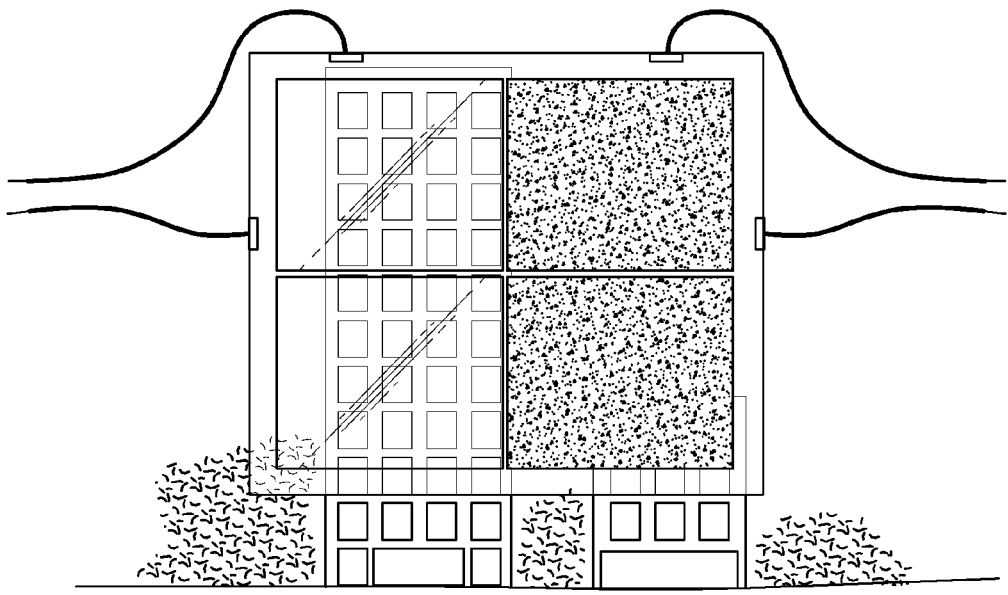
Figure 6C:
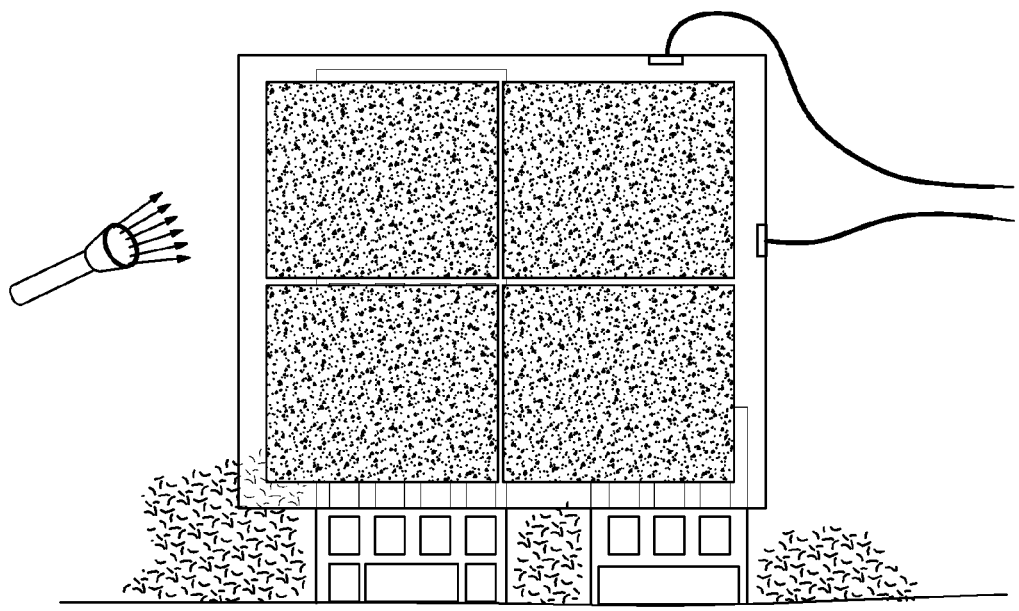
Figure 6D:
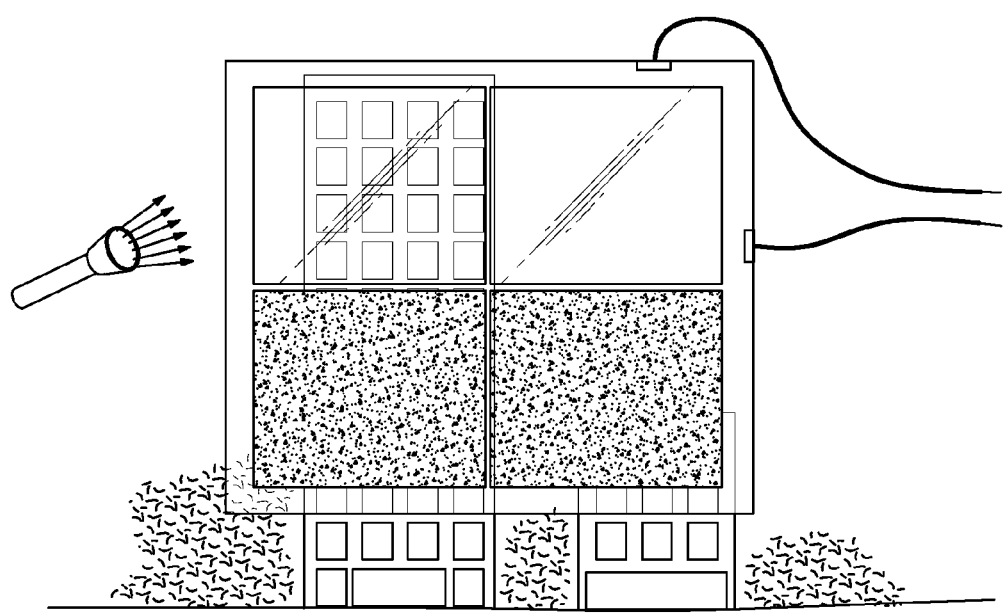

FIGS. 6a-6d show examples of the bistable electrically switchable film window according to an example. In FIG. 6a, the window is shown with no electric voltage applied while FIG. 6b shows an electric switching voltage applied to the left side of the film. As can be seen, when no electric field is applied, the film is in a scattering mode, and forms an opaque surface. Upon application of an electric voltage, the film becomes transparent as seen in FIG. 6b. Similarly, as seen in FIGS. 6c and 6d, the film is in a scattering mode in FIG. 6c and reflects a source of light directed toward it, while becoming transparent at an upper portion of the film when an electric voltage is applied as seen in FIG. 6d.

An illustrative second embodiment, similar to that shown in FIG. 2 of the electro-optical device of the invention, will be described. The electro-optical structure 10 generally comprises a CLC material 12 interposed between a pair of optically-transparent electrically-conductive layers 14a and 14b supported upon a pair of spaced-apart transparent substrates 16a and 16b, each substrate having an interior and exterior surface, respectively, the perimeter edges of which are sealed, and across which a voltage is applied under the control of a microcontroller (not shown). As used herein the term "transparent" means that the film does not absorb a significant amount visible radiation and does not reflect a significant amount of visible radiation, rather, it is transparent to visible radiation. A plurality of spacers 18 may be included within CLC material 12 to separate and maintain the space between the optically transparent electrically-conductive layers 14a and 14b.

The transparent electrically conductive layers 14a and 14b may comprise indium tin oxide (ITO), silver, zinc oxide or other optically transparent conductive polymer or like film coating. Chemical vacuum deposition, chemical vapor deposition, evaporation, sputtering, or other suitable coating techniques may be used for applying the conductive layers 14a and 14b to the transparent substrates 16a and 16b.

Examples of transparent substrates 16a and 16b include polymer films. The polymer films include films made of polyolefin, polyester, polyvinyl chloride, polyvinyl fluoride, polyvinylidene difluoride, polyvinylidene chloride, polyacrylate, polycarbonate, polyurethane, etc., and combinations thereof. In one embodiment, the flexible films comprise PET films. The transparent substrates 16a and 16b may also include glass panels and rigid polymeric films.

Figures 7A, 7B:
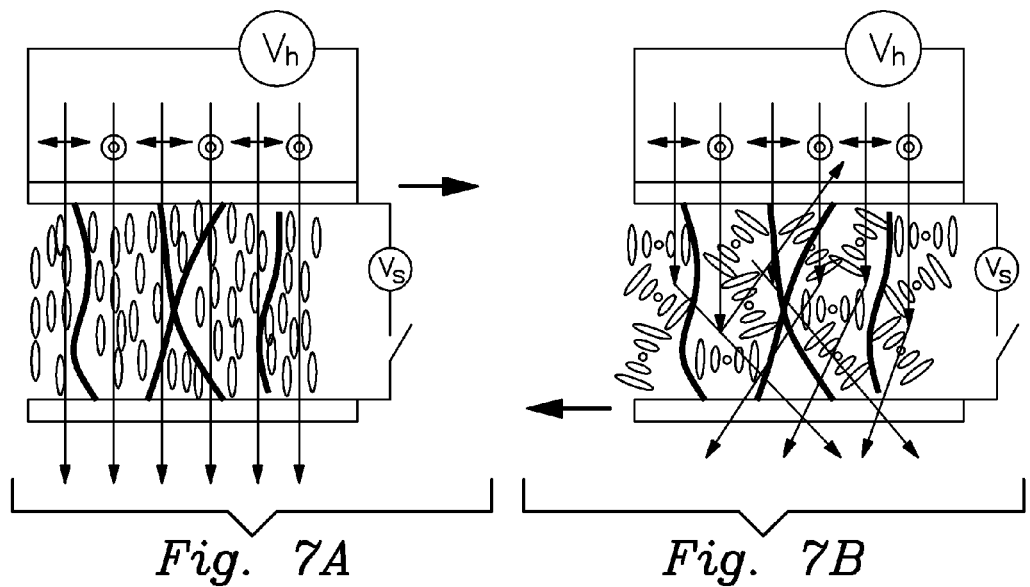
FIG. 7a is a cross section of a second embodiment of a display cell showing the transparent state of a bistable polymer stabilized cholesteric texture material used for switchable windows.
FIG. 7b is a response of a second embodiment of the bistable switchable liquid crystal window to an elevated temperature.

Electrical leads may be attached to the conductive layers 14a and 14b of substrates 16a and 16b. A voltage source, $V_s$, as seen in FIGS. 7a and 7b, is shown connected to the conductive layers in order to switch the CLC between different optical states by application of an electric field pulse. The voltage source may be an AC voltage source or a DC-AC inverter and a battery. In addition, the switching power may be supplied by a photovoltaic device that converts solar power to electrical power, or other suitable electrical generator.

A subsequent heating voltage, $V_h$, also seen in FIGS. 7a and 7b, is shown connected to connected to the conductive layers 14a and 14b of the substrates 16a and 16b. The heating voltage may be applied to at least one of the conductive layers 14a and 14b in which heat is conducted through the conductive layers resulting in the heating of the CLC material 12 up to a predetermined temperature. The predetermined temperature may also be generated or supplied in other suitable manners.

In an example, the CLC material 12 comprises cholesteric, chiral nematic, liquid crystals and a chiral dopant. The CLC material may also include a polymer matrix formed from at least one chiral material, at least one polymerizable monomer and a photo-initiator. The polymer matrix stabilizes or supports the cholesteric liquid crystals.

In an embodiment, the CLC material 12 comprises a polymer matrix having cholesteric liquid crystals stabilized or supported therein. The polymer matrix is generally formed by polymerization or crosslinking of at least one polymerizable monomer or crosslinkable polymer with non-reactive cholesteric liquid crystals, and a chiral additive. Polymerization of the liquid crystal mixture is initialized in any suitable manner, as by UV radiation, thermally, and other initiating techniques recognized to one skilled in the art, depending upon the polymer selected. The monomer may be polymerized in the homeotropic state, where the CLC material 12 and monomer are aligned substantially perpendicular to the substrates 16a and 16b, in the presence of a sufficiently high voltage. The polymer network has a sufficiently strong aligning effect on the CLC material 12 to hold the liquid crystalline material in the transparent homeotropic texture after polymerization as shown in FIG. 7a. The homeotropic state is stable after the removal of the voltage at zero field.

When the bistable switchable liquid crystal device is required to be in the scattering state, a heating voltage, $V_h$, may be applied to one (or both) of the conductive layers 14a and 14b in order to heat the CLC material up to a predetermined temperature. In another embodiment, the CLC material may be heated up to the predetermined temperature by the ambient matter (such as air), or any other suitable system. Upon heating, the CLC material 12 switches from a optically transparent homeotropic state to an optically scattered focal conic state. The CLC material 12 remains in the optically scattered focal conic state when cooled to ambient temperature at zero voltage. In this optically scattered focal conic state, the CLC material of the electro-optical device 10 substantially prevents light from passing through the device. The temperature to switch the electro-optical device 10 may be adjusted by using cholesteric liquid crystals with different cholesteric-isotropic transition temperatures. In this manner, the device may be configured to operate in a predetermined manner according to the temperature at which switching of the electro-optical device occurs. For example, the liquid crystal material may be selected to allow switching to occur automatically upon being exposed to a predetermined temperature, such as in relation to ambient conditions.

When the device 10 is desired to be returned to the optically transparent state, a sufficiently high switching voltage may be applied across at least one of the conductive layers and into the CLC material 12. This voltage treatment switches the CLC material 12 from the optically scattered focal conic state to the optically transparent homeotropic state and remains in the homeotropic state after the removal of the applied voltage.

The cholesteric liquid crystal material may include at least about 80.0% by weight cholesteric liquid crystal material, at least about 11.0 by weight of chiral dopant material and at least about 0.5% by weight photo-initiator.

In one embodiment, the polymer matrix is formed from crosslinking a mixture of at least one crosslinkable monomer, at least one non-crosslinkable liquid crystal and at least one chiral dopant. A liquid crystal polymer stabilized cholesteric texture is formed when a UV crosslinkable polymer in its liquid crystal phase and a photoinitiator are mixed with a CLC material whose pitch is tuned to the infrared region. The crosslinkable monomer concentration is typically greater than about 5.0% by weight of the total CLC mixture. The mixture may then cured by exposure to UV light while a voltage or a magnetic field is applied to align the liquid crystal as well as the polymer molecules in the direction across the device thickness. With the field applied during curing, the CLC molecules are aligned in a planar, optically transparent state after curing.

Particularly useful polymerizable materials include acrylate and methacrylate monomers. Examples of suitable photopolymerizable monomers include acrylic acid and methacrylic acid, esters thereof, each of which contains an alkyl group, an aryl group, or a cycloalkyl group including three or more carbon atoms, and halides thereof. Such photocurable monomers are, for example, isobutyl acrylate, stearyl acrylate, lauryl acrylate, isoamyl acrylate, 2-ethylhexyl acrylate, n-butyl methacrylate, n-lauryl methacrylate, tridecyl methacrylate; n-stearyl methacrylate, n-cyclohexyl methacrylate, benzyl methacrylate, isobornyl methacrylate, 2-phenoxyethyl methacrylate, 2,2,3,4,4,4-hexafluorobutyl methacrylate, 2,2,3,4,4,4-hexachlorobutyl methacrylate, 2,2,3,3-tetrachloropropyl methacrylate, 2,2,3,3-tetrachloropropyl methacrylate, perfluorooctylethyl methacrylate, perfluorooctylethyl acrylate, and perchlorooctylethyl methacrylate. Polyfunctional compounds may also be used. Polyfunctional compounds are, for example, ethylene glycol dimethacrylate, bisphenol-A diacrylate, bisphenol-A dimethacrylate, 1,4-butanediol dimethacrylate, 1,6-hexanediol dimethacrylate, trimethylolpropane triacrylate, and tetramethylolmethane tetraacrylate. Other monomers include mono-functional monomers including SK (Liquid Crystal Institute and Kent State University) and RM257 from Merck and a bi-functional monomer SK (Liquid Crystal Institute and Kent State University). Such monomers and polyfunctional compounds may be used independently or in a combination of two or more.

Useful photoinitiators include benzoin methyl ether, IRGACURE® 651 as well as other photoinitiators known to those in art.

In one embodiment, the bistable switchable liquid crystal device is prepared by mixing the following materials:
  83.4% by weight nematic liquid crystal E7 (Merck);
  11.0% by weight chiral dopant R811 (Merck);
  3.00% by weight monomer RM257 (Merck); and
  0.5% by weight IRGACURE® 651 (Ciba)

The mixture is dissolved in a compatible organic solvent to form a solution. The solution is then introduced into a cell having a cell thickness of about 10 microns that includes two parallel glass substrates with ITO electrodes separated by 15 micron spacers. The cell is irradiated by UV light for initiation of photo-polymerization with a UV intensity of 11.3 mW/cm$^2$ and a curing time of about 1 hour. During curing, the mixture is in the homeotropic state in the presence of a sufficiently high voltage (about 60 V). After the polymerization, the bistable switchable liquid crystal device is in the transparent homeotropic state.

Figure 8:
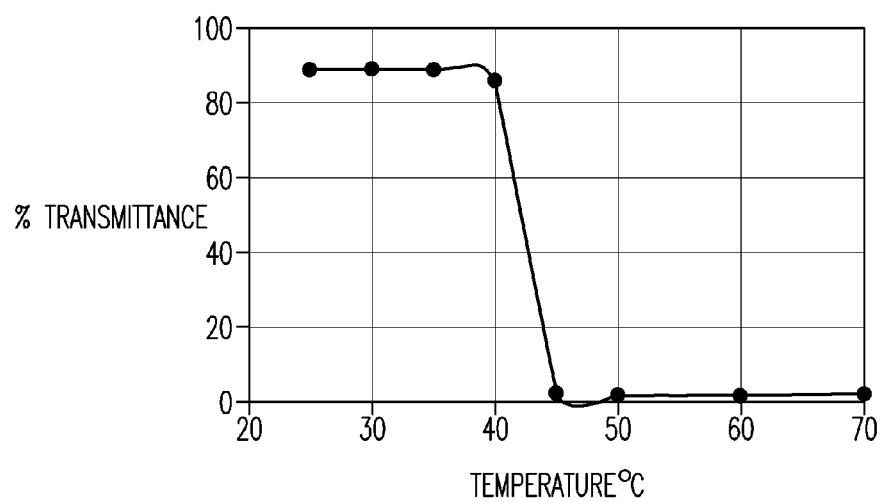
FIG. 8 is the measured transmittance of a second embodiment of the bistable switchable liquid crystal window as a function of different elevated temperatures.

The bistable switchable liquid crystal device is initially in the optically transparent homeotropic state with high transmittance. After subjecting the device to heat treatment and subsequent cooling to room temperature, its transmittance was measured. The results are shown in FIG. 8. When the device is heated to a temperature of up to 44° C., an optically scattered focal conic state is observed. The device remained in the focal conic state when cooled to room temperature, and the transmittance was low.

Figure 9:
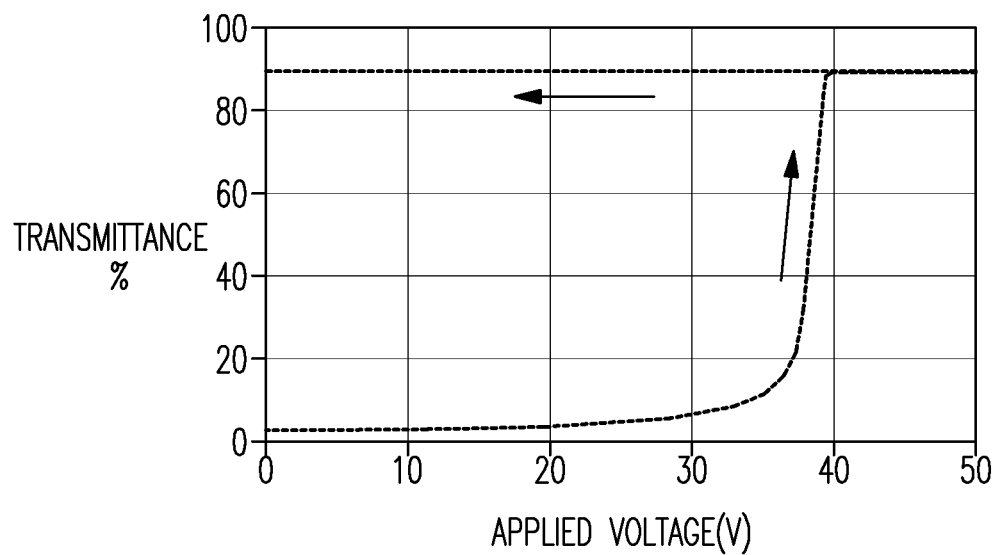
FIG. 9 is the measured transmittance of a second embodiment of the bistable switchable liquid crystal window as a function of applied voltage.

Once the bistable switchable liquid crystal device is thermally switched to the scattering focal conic texture, it remains there at zero field. The device may be switched to the optically transparent homeotropic texture by applying a voltage. The response of the device initially in the focal conic texture to applied voltage is shown in FIG. 9. As the applied voltage is increased (as shown by curve 90) above 40V, the cell switches to the optically transparent homeotropic state and its transmittance increases. When the applied voltage is decreased and removed as shown by curve 92, the device remains in the homeotropic state with high transmittance.

Figure 10A:
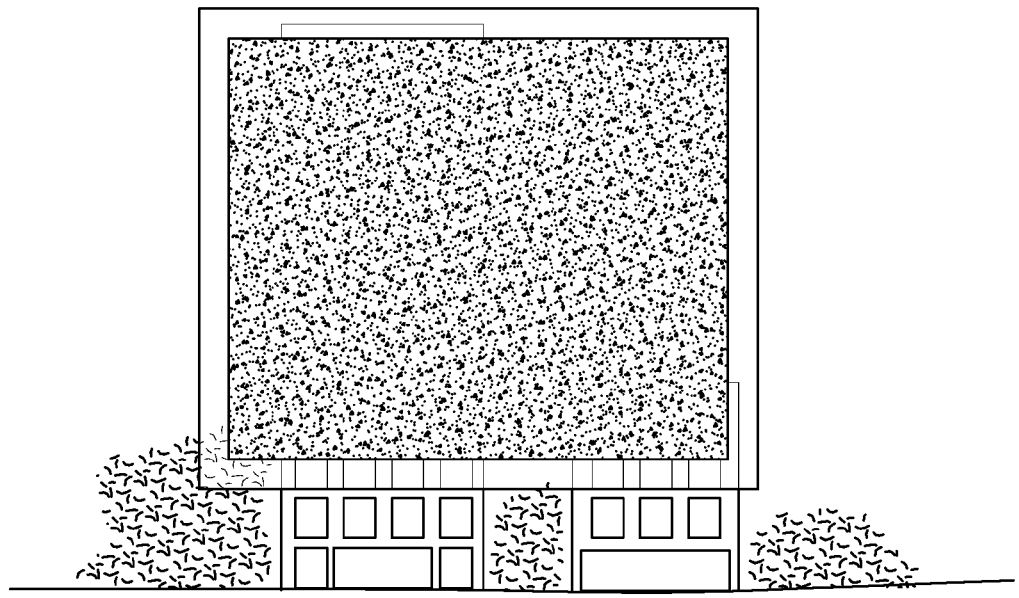
FIG. 10a shows an example of a second embodiment of the bistable switchable liquid crystal window at zero voltage in a focal conic state.
Figure 10B:
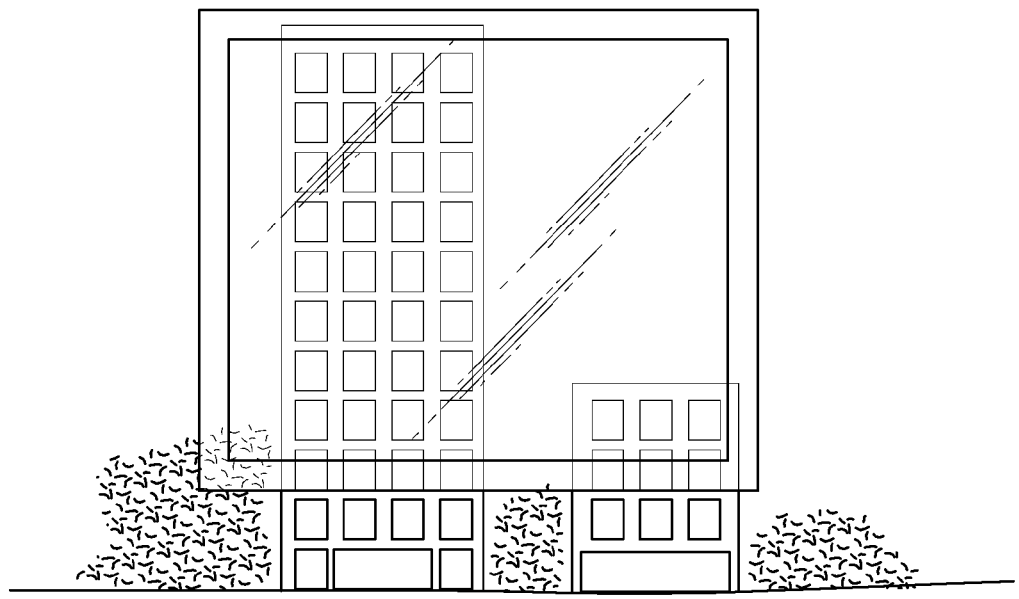
FIG. 10b shows an example of a second embodiment of the bistable switchable liquid crystal window at zero voltage in a homeotropic state.

The bistable switchable liquid crystal device is bistable at zero voltage. A photograph of the device thermally switched to the optically scattered focal conic texture at zero field and room temperature is shown in FIG. 10*a*. In the scattering state, the device substantially blocks the images in the background as seen through the device. An image of the device electrically switched to the optically transparent homeotropic state at zero field and room temperature is shown in FIG. 10*b*. In the optically transparent state, the device permits the images in the background to be seen through the device.

In an embodiment of the invention, the bistable switchable liquid crystal device may be used to make smart architectural and greenhouse windows to control light energy flow. When ambient temperature is low, the device is switched to the optically transparent homeotropic state by a voltage pulse and remains there afterward. Sunlight may pass through the window to increase the internal temperature of the building. When the ambient temperature is increased above a preset value, the window may be set to automatically switch to the optically scattered focal conic state. Part of sunlight is blocked from passing through the window and the heating effect of sunlight on the building is essentially reduced.

In further examples, a polymer stabilized cholesteric texture (PSCT) switchable window or light shutter is made from a composite of cholesteric liquid crystal and polymer. The PSCT material is bistable, such that both optical scattering or opaque state and transparent state are stable without applied voltage over prolonged periods. In this example, the cholesteric liquid crystal used is a dual frequency cholesteric liquid crystal. Under a low frequency AC voltage, the liquid crystal exhibits a positive dielectric anisotropy and tends to be aligned parallel to the applied electric field. Under a high frequency AC voltage, the liquid crystal exhibits a negative dielectric anisotropy and tends to be aligned perpendicular to the applied electric field. The PSCT material can thus be switched between a transparent state and an opaque state by voltage pulses of different frequencies. No voltage has to be applied to sustain the optical states, and therefore the switchable window made from such a material is energy-saving, while operating in the desired manner.

A bistable switchable window is made similar to previous embodiments, wherein a mixture of a monomer, a dual frequency cholesteric liquid crystal and a photo-initiator are provided and dissolved in a solvent to form a solution. The solution is introduced into and sandwiched between two transparent substrates, such as glass or plastic substrates. At least one of the substrates is provided with an electrode for applying electrical pulses to the PSCT material between the substrates. In an example, both substrates are provided with transparent electrodes to selectively apply desired electric fields to the PSCT material. The PSCT material is irradiated by UV light for photo-polymerization, or the monomer is otherwise polymerized in a suitable manner. During the polymerization, an electric field may be applied to align the material in the substrate normal direction and form a polymer network in a manner similar to that previously described. Other suitable methods to align the material in this manner could be used. The monomer forms a polymer network along the substrate normal direction, and produces an aligning and confining effect on the liquid crystal material after polymerization. The polymer network is configured to substantially align the liquid crystal parallel to it as seen in FIG. 11*a*, wherein the liquid crystal material is shown at 100, with the polymer network shown at 102. The polymer network 102 effectively form microdomains between the substrates in which liquid crystal material 100 is disposed, with the polymer network extending between the substrates as shown in FIG. 11*a*. In this manner, the polymer network 102 tends to align the liquid crystal 100 parallel to it within the microdomains formed by the polymer network 102.

After polymerization, when the applied voltage is turned off, the liquid crystal remains in the homeotropic texture (state) as shown in FIG. 11*a*, because of the aligning and confining effects of the polymer network 102. In this state, the liquid crystal is parallel to the polymer network 102, and the PSCT material is effectively transparent to light. Thereafter, a sufficiently high voltage of high frequency may be applied across the two substrates as shown at 104, wherein the liquid crystal has a negative dielectric and isotropy and is tilted away from the substrate normal direction as shown in FIG. 11*b*. The material is switched to the poly-domain state as shown in FIG. 11*b*, wherein the PSCT material become scattering as shown in FIG. 11*b*. When the applied high frequency voltage is turned off as shown at 106, the material remains in the scattering state, because the intermolecular interaction between the liquid crystal molecules favors the twisted state in the microdomains formed by the polymer network 102. In this state, the orientation of the liquid crystal is random with respect to the polymer network 102, and the polymer network 102 cannot unwind the twist structure of the liquid crystal, and therefore cannot align the liquid crystal parallel to it. When a sufficiently high voltage of a low frequency is applied across the two substrates as shown at 108, the liquid crystal has a positive dielectric anisotropy and the twist structure of the liquid crystal is unwound with the liquid crystal aligned parallel to the substrate normal direction as shown in FIG. 1*d*. The material is thus switched to the homeotropic state as shown in FIG. 1*d*, and the PSCT material becomes transparent again. When the applied low frequency voltage is turned off from this state as shown at 110, the material remains in the transparent state as shown in FIG. 11*a*.

The properties of the PSCT material depends on the pitch of the cholesteric liquid crystal and the morphology and volume fraction (concentration) of the polymer network. The polymer network 102 favors the transparent homeotropic state while the intermolecular interaction between the liquid crystal molecules favors the scattering poly-domain state. When the polymer network concentration is higher, the aligning and confining effects of the polymer network 102 are larger. When the pitch of the liquid crystal is shorter, it is more difficult to unwind the twist structure of the liquid crystal. The scattering efficiency of the PSCT material is also dependent on the polymer network concentration and the pitch of the liquid crystal. Thus, a balance between the pitch of the cholesteric liquid crystal and the morphology and volume fraction of the polymer network is selected to allow each of the transparent and opaque states to remain stable without applied voltage as shown in the example of FIG. 11.

In an example, a mixture with the following components was mixed:
- 89.5% by weight dual frequency nematic liquid crystal;
- 4.0% by weight chiral dopant;
- 6.0% by weight monomer; and
- 0.5% by weight photo-initiator.

The material used in this example may be similar to that described in prior examples, with known dual frequency nematic liquid crystals provided for use in the mixture. The mixture is dissolved in a compatible organic solvent to form a solution, and it is then introduced into a cell having a cell thickness of about 10 microns. The two parallel substrates may be provided with ITO electrodes as in prior examples. The cell was then irradiated by UV light for initiation of photo-polymerization, such as using a UV intensity of 11.3 mW/cm$^2$ and a curing time of about 1 hour. During curing, the mixture is in the homeotropic state in the presence of a sufficiently high voltage, such as about 60 volts. After the polymerization, the bistable switchable liquid crystal device is in the transparent homeotropic state.

Figure 12A:
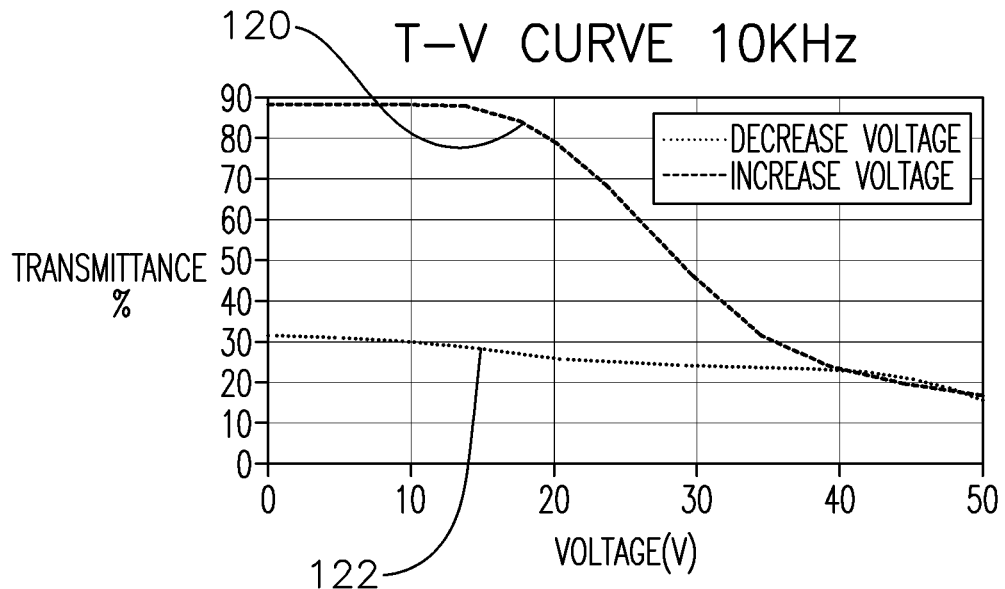
FIGS. 12a and 12b show graphs of transmittance versus applied voltage of the bistable switchable window as described with reference to FIG. 11, at 10 kHz and 100 HZ respectively.
Figure 12B:
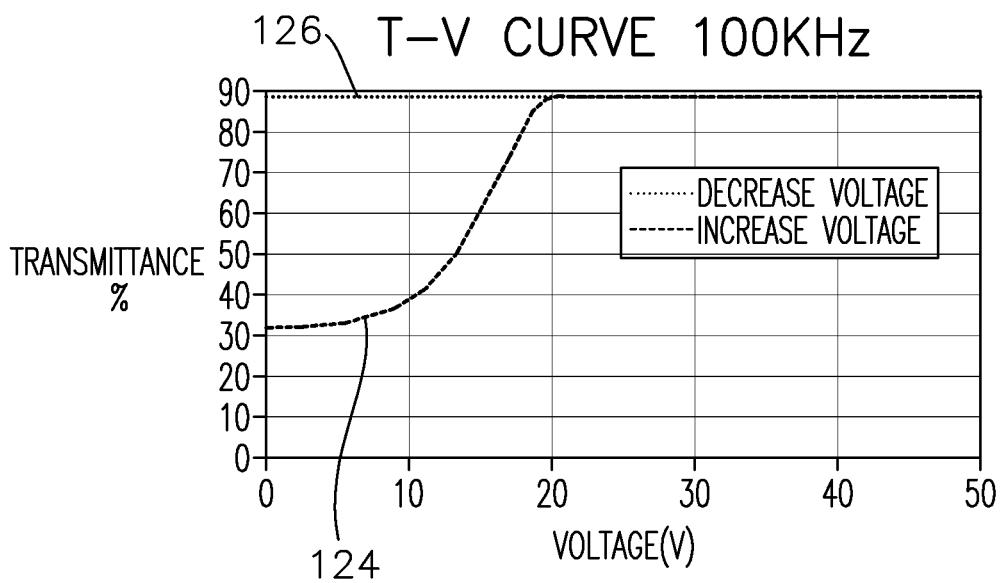

The bistable switchable liquid crystal device accordingly to this example is initially in the optically transparent homeotropic state with high transmittance. The response of the PSCT window to applied voltages of first and second frequencies is then shown in FIG. 12, wherein the transmittance versus applied voltage of the PSCT for a first voltage at 10 KHz in FIG. 12*a* and a second voltage at 100 Hz as shown in FIG. 12*b*. As seen in FIG. 12*a*, 120 shows the response of the PSCT window made according to this example with an increase in voltage, while curve 122 shows the response for a decrease in voltage at this frequency. In FIG. 12*b*, curve 124 shows the response of the PSCT window to the applied voltage as the voltage is increased, while curve 126 shows the response for a decrease in voltage at the low frequency. As seen in these response curves, the PSCT window according to the example provides stable transmittance at the first and second frequencies after a sufficiently high voltage of the first or second frequencies is applied to the material.

In another example, the bistable switchable liquid crystal device is prepared by mixing the following materials:
- 85.53% by weight dual frequency nematic liquid crystal;
- 5.9% by weight chiral dopant;
- 8.0% by weight monomer;
- and 0.47% by weight photo-initiator.

The material used in this example may be similar to that described in prior examples, with known dual frequency nematic liquid crystals provided for use in the mixture. The mixture is dissolved in a compatible organic solvent to form a solution, and it then introduced into a cell having a cell thickness of about 10 microns. The two parallel substrates maybe provided with ITO electrodes as in prior examples. The cell was then eradiated by UV light for initiation of photo-polymerization, such as using a UV intensity of 11.3 mW/cm$^2$ and a curing time of about 1 hour. During curing, the mixture is in the homeotropic state in the presence of a sufficiently high voltage, such as about 60 volts. After the polymerization, the bistable switchable liquid crystal device is in the transparent homeotropic state.

Figure 13A:
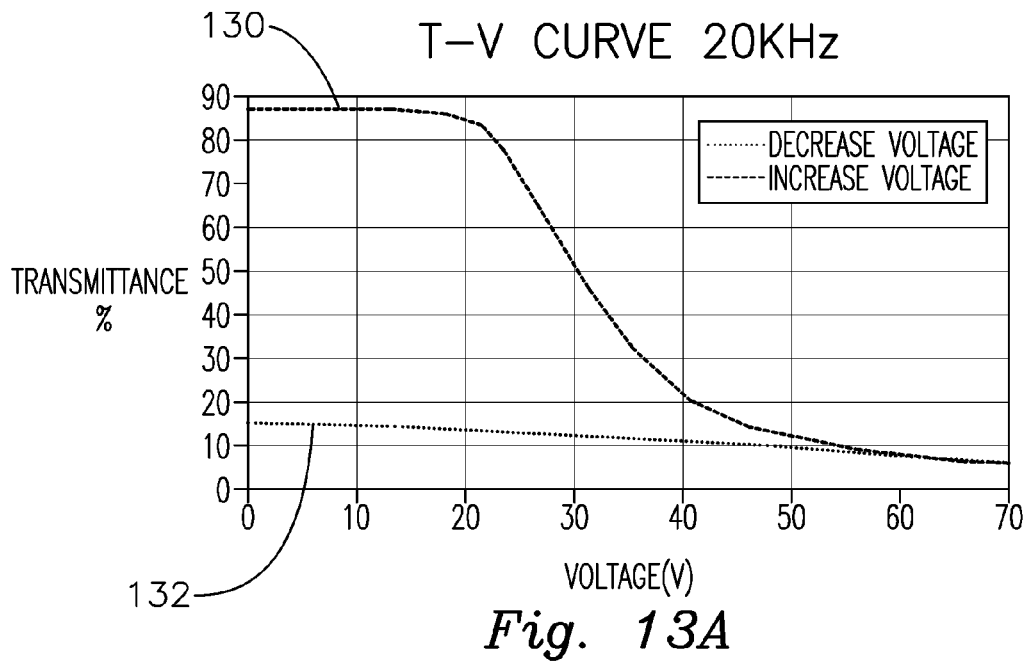
FIGS. 13a and 13b show graphs of transmittance versus applied voltage of a bistable switchable window according to an example of the invention at 20 kHz and 100 HZ respectively.
Figure 13B:
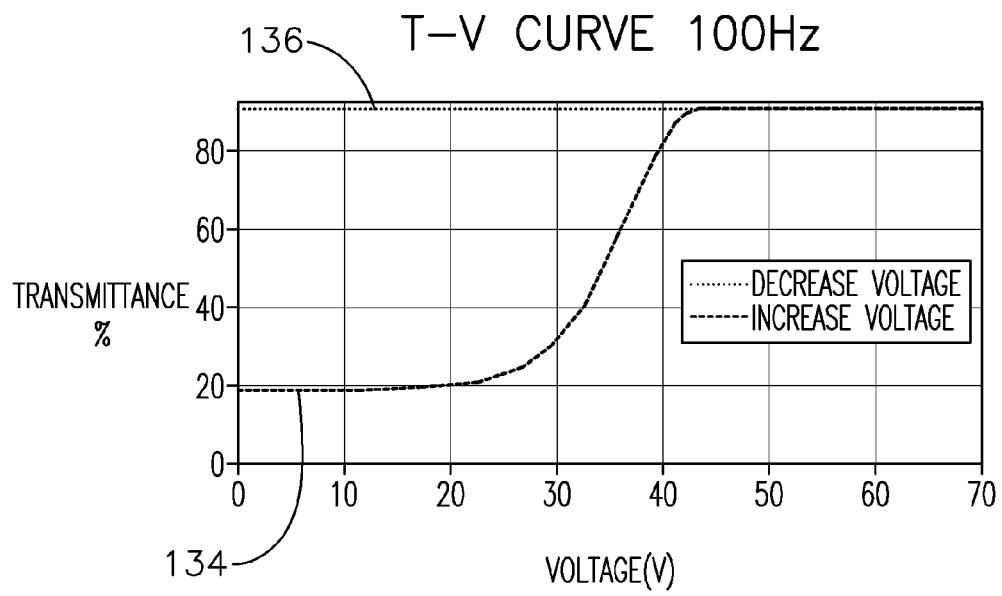

The bistable switchable liquid crystal device accordingly to this example is initially in the optically transparent homeotropic state with high transmittance. The response of the PSCT window to applied voltages of first and second frequencies is then shown in FIG. 13, wherein the transmittance versus applied voltage of the PSCT for a first voltage at 10 KH in FIG. 13*a* and a second voltage at 100 Hz is shown in FIG. 13*b*. As shown in FIG. 13*a*, curve 130 shows the response of the PSCT window made according to this example with an increase in voltage, while curve 132 shows the response for a decrease in voltage at this frequency. In FIG. 13*b*, curve 134 shows the response of the PSCT window to the applied voltage as the voltage is increased, while curve 136 shows the response for a decrease in voltage at this low frequency. As seen in these response curves, the PSCT window according the example provides stable transmittance at the first and second frequencies after a sufficiently high voltage of the first or second frequencies is applied to the material.

In an example, a mixture with the following components was mixed:
- 85.2% by weight dual frequency nematic liquid crystal;
- 6.0% by weight chiral dopant;
- 8.0% by weight monomer;
- and 0.8% by weight photo-initiator.

The material used in this example may be similar to that described in prior examples, with known dual frequency nematic liquid crystals provided for use in the mixture. The mixture is dissolved in a compatible organic solvent to form a solution, and it then introduced into a cell having a cell thickness of about 10 microns. The two parallel substrates maybe provided with ITO electrodes as in prior examples. The cell was then eradiated by UV light for initiation of photo-polymerization, such as using a UV intensity of 11.3 mW/cm$^2$ and a curing time of about 1 hour. During curing, the mixture is in the homeotropic state in the presence of a sufficiently high voltage, such as about 60 volts. After the polymerization, the bistable switchable liquid crystal device is in the transparent homeotropic state.

Figure 14A:
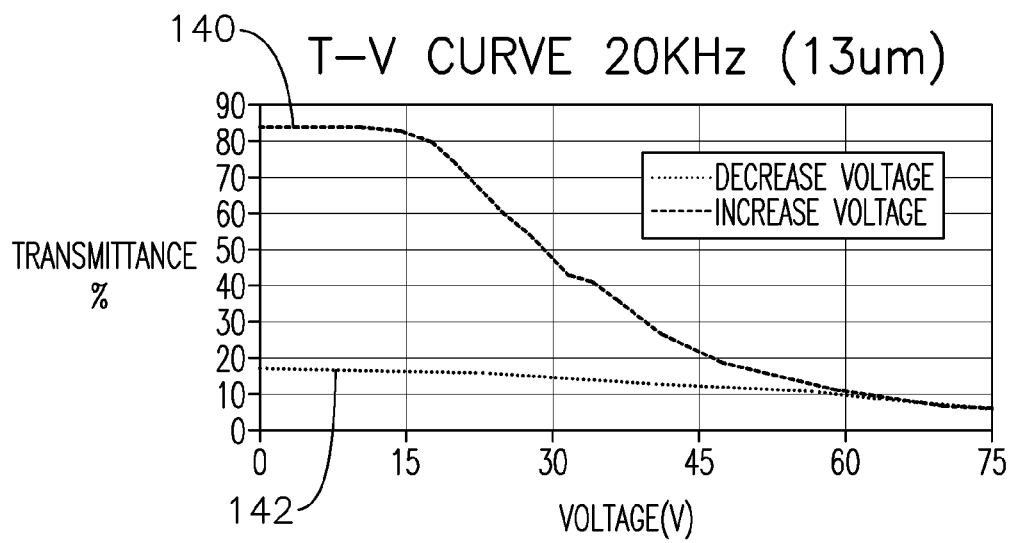
FIGS. 14a and 14b show graphs of transmittance versus time for a bistable switchable window according to examples in relation to voltage pulses of 100 HZ and 20 kHz respectively.
Figure 14B:
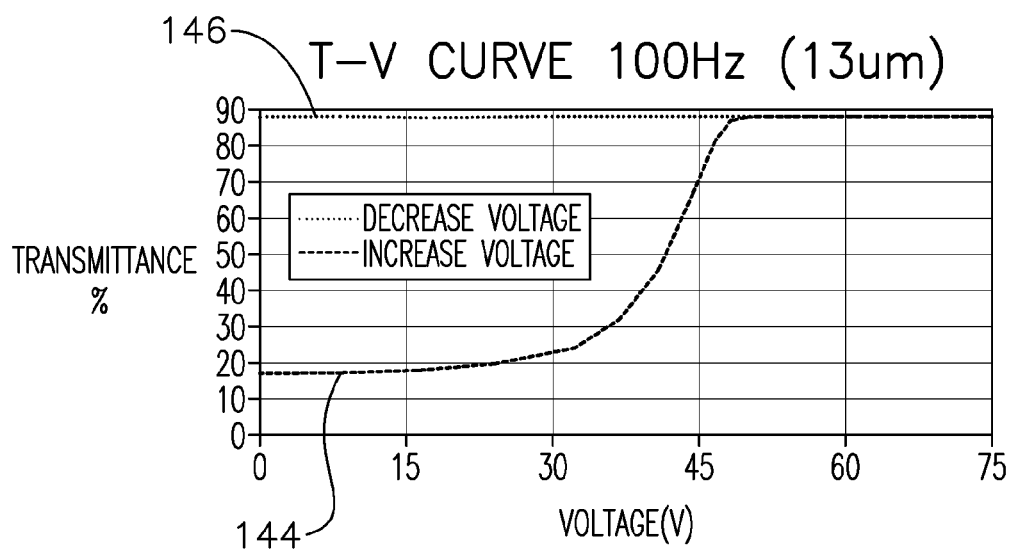

The bistable switchable liquid crystal device accordingly to this example is initially in the optically transparent homeotropic state with high transmittance. The response of the PSCT window to applied voltages of first and second frequencies is then shown in FIG. 14, wherein the transmittance versus applied voltage of the PSCT for a first voltage at 10 KHz in FIG. 14a and a second voltage at 100 Hz as shown in FIG. 14b. As shown in FIG. 14a, 140 shows the response of the PSCT window made according to this example with an increase in voltage, while curve 142 shows the response for a decrease in voltage at this frequency. In FIG. 14b, curve 144 shows the response of the PSCT window to the applied voltage as the voltage is increased, while curve 146 shows the response for a decrease in voltage at the lower frequency. As seen in these response curves, the PSCT window according to the example provides stable transmittance at the first and second frequencies after a sufficiently high voltage of the first or second frequencies is applied to the material.

Figure 15A:
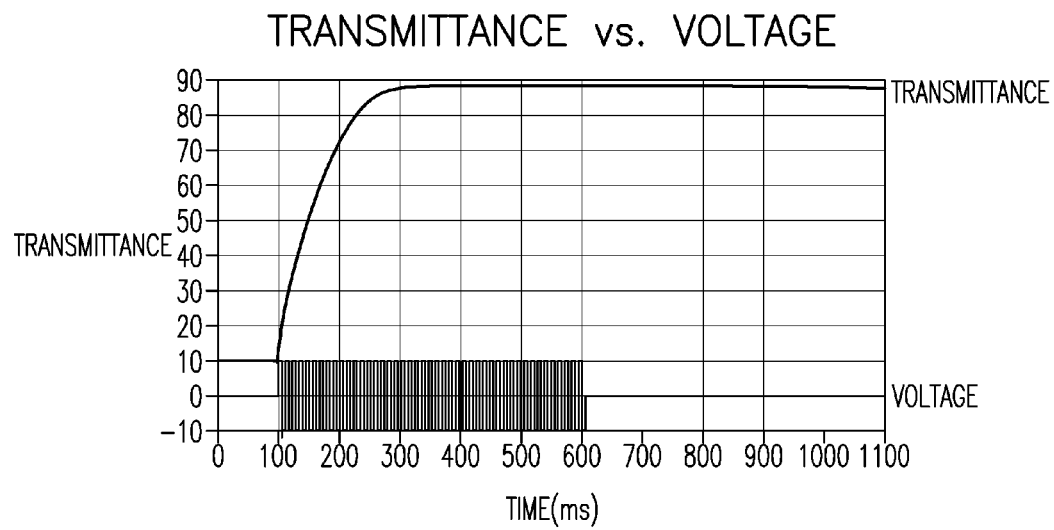
FIGS. 15a and 15b show the response of a bistable switchable window to low and high frequency voltage pulses respectively.
Figure 15B:
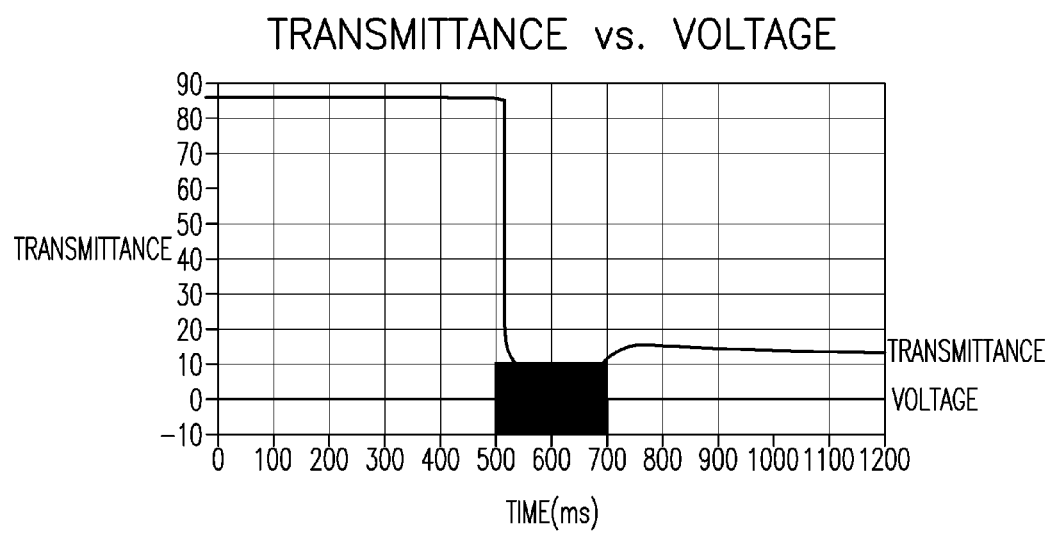

Referring to FIGS. 15a and 15b, the response of a PSCT switchable window according to this example in relation to voltage pulses is shown. When a low frequency voltage, such as about 100 Hz voltage pulse is applied to the material, it is switched to the transparent state, and remains in the transparent state after the pulse is removed, as shown in FIG. 15a. When a high frequency, about 20 KHz voltage pulse is applied to the material, it is switched to the scattering state, and remains in the scattering state after the pulse is removed, as shown in FIG. 15b. Although particular high and low frequencies are described with reference to these examples, other suitable frequencies may be used corresponding to the type of liquid crystal material used.

Based upon the foregoing disclosure, it should now be apparent that the bistable switchable liquid crystal window as described herein will carry out the objects set forth hereinabove. It is, therefore, to be understood that any variations evident fall within the scope of the claimed invention and thus, the selection of specific component elements can be determined without departing from the spirit of the invention herein disclosed and described.

What is claimed is:

1. A bistable switchable liquid crystal device comprising:
 a first transparent substrate having an interior and exterior surface;
 a second transparent substrate having an interior and exterior surface, wherein the first and second substrates are separated by a predetermined distance;
 an electrically conductive layer located on the interior surface of at least one of the first and second substrates;
 a cholesteric liquid crystal material comprising at least one nematic liquid crystal material; and
 a polymer matrix comprising at least one chiral material and at least one polymerizable material, wherein the cholesteric liquid crystal material is provided adjacent the at least one electrically conductive layer, and wherein the cholesteric liquid crystal material is switched from a transparent homeotropic state to a light scattering focal conic state upon application of a high frequency voltage pulse and from a light scattering focal conic state to a transparent homeotropic state upon application of a low frequency voltage pulse.

2. The device of claim 1, wherein no further amount of voltage to the device is required in order to maintain either the transparent state or the light scattering state.

3. The device of claim 1, wherein the cholesteric liquid crystal material comprises at least about 90.0% by weight nematic liquid crystal material.

4. The device of claim 1, wherein the polymer matrix comprises at least about 3.0% by weight chiral material, at least about 6.0% by weight polymerizable material, and at least about 0.5% by weight photo-initiator.

5. The device of claim 1, wherein the at least one polymerizable material is a mono-functional monomer.

6. The device of claim 1, wherein the at least one polymerizable material is a bi-functional monomer.

7. The device of claim 1, wherein the at least one polymerizable material includes a mono-functional and a bi-functional monomer.

8. The device of claim 1, wherein the at least one liquid crystal material is a dual frequency liquid crystal.

9. The device of claim 1 wherein the cholesteric liquid crystal material has a thickness of about at least 10 microns.

10. The device of claim 1, wherein application of the electric field over a predetermined threshold voltage switches the liquid crystal material of the polymer matrix to an optically transparent homeotropic state.

11. The device of claim 1, wherein the cholesteric liquid crystal material exhibits a positive dielectric anisotropy.

12. The device of claim 1, wherein the liquid crystal material exhibits dual dielectric anisotropies.

13. The device of claim 12, wherein the liquid crystal material exhibits a positive dielectric anisotropy and tends to be aligned parallel to the applied electric field having a low frequency, and a negative dielectric anisotropy and tends to be aligned perpendicular to the applied electric field having a high frequency.

14. The device of claim 1, wherein the polymer matrix maintains stability of both the light transmitting and light scattering states without application of an electric field.

15. The device of claim 1, wherein the polymer matrix includes a polymer network where microdomains of liquid crystal material are dispersed between the network.

16. The device of claim 15, wherein the microdomains include liquid crystals that tend to be aligned with the polymer networks extending between the substrates.

17. The device of claim 1, wherein the liquid crystal material is a PSCT material.

18. A smart architectural window comprising the device of claim 1.

19. A greenhouse window comprising the device of claim 1.

20. The device of claim 1, wherein the polymer matrix is formed by curing the at least one polymerizable material in the presence of an external electric field, wherein application of the electric field aligns the liquid crystal material in the substrate normal direction.

21. A bistable switchable liquid crystal device comprising:
 a first transparent substrate having an interior and exterior surface;
 a second transparent substrate having an interior and exterior surface, wherein the first and second substrates are separated by a predetermined distance;
 an electrically conductive layer located on the interior surface of each of the first and second substrates;
 a liquid crystal material comprising at least one nematic liquid crystal material; and
 a polymer matrix comprising at least one chiral material and at least one polymerizable material, wherein the liquid crystal material is provided adjacent the at least one electrically conductive layer, and wherein the liquid crystal material is switchable to an optically transparent homeotropic state upon application of an electric field or an elevated temperature.

22. The device of claim 21, wherein application of the electric field over a predetermined threshold voltage switches the liquid crystal material of the polymer matrix to an optically transparent homeotropic state.

23. The device of claim 22, wherein the device remains substantially in the optically transparent homeotropic state after removal of the electrical field.

24. The device of claim 21, wherein application of the elevated temperature switches the liquid crystal material of the polymer matrix from a transparent homeotropic state to an optically scattered focal conic state.

25. The device of claim 21, wherein the elevated temperature is applied to the device by a heating voltage applied to at least one of the substrates.

26. The device of claim 21, wherein the elevated temperature is applied to the device by heating ambient matter surrounding the device.

27. The device of claim 26, wherein the ambient matter is air.

28. The device of claim 24, wherein the elevated temperature is at least about 44° C.

29. The device of claim 24, wherein the device remains substantially in the optically scattered focal conic state when cooled to ambient temperature at zero voltage.

30. The device of claim 21, wherein the liquid crystal material is a cholesteric liquid crystal.

31. The device of claim 21, wherein the liquid crystal material comprises a plurality of types of cholesteric liquid crystals, wherein each of the plurality of types of cholesteric liquid crystal has a different cholesteric-isotropic transition temperature.

32. A smart architectural window comprising the device of claim 21.

33. A greenhouse window comprising the device of claim 21.

34. The device of claim 21, wherein the liquid crystal material of the polymer matrix comprises at least about 80.0% by weight cholesteric liquid crystal material.

35. The device of claim 34, wherein the polymer matrix comprises at least about 11.0% by weight chiral material, at least about 5.0% by weight polymerizable material, and at least about 0.5% by weight photo-initiator.

36. The device of claim 21, wherein the at least one polymerizable material is a mono-functional monomer.

37. The device of claim 21, wherein the at least one polymerizable material is a bi-functional monomer.

38. The device of claim 21, wherein the at least one polymerizable material includes a mono-functional and a bi-functional monomer.

39. The device of claim 21, wherein a plurality of spacers separate the first and second transparent substrates.

40. A bistable switchable liquid crystal device comprising:
a first transparent substrate having an interior and exterior surface;
a second transparent substrate having an interior and exterior surface, wherein the first and second substrates are separated by a predetermined distance;
an electrically conductive layer located on the interior surface of at least one of the first and second substrates;
a liquid crystal material comprising at least one nematic liquid crystal material; and
a polymer matrix comprising at least one chiral material and at least one polymerizable material, wherein the liquid crystal material is contained adjacent the at least one electrically conductive layer, and wherein the liquid crystal material is switchable between a transparent homeotropic state to a light scattering focal conic state upon application of a first predetermined frequency voltage pulse and from a light scattering focal conic state to a transparent homeotropic state upon application of a second predetermined frequency voltage pulse, where the first predetermined frequency is lower than the second predetermined frequency.

41. An electro-optical device comprising: at least one transparent substrate, at least one electrically conductive layer located on the at least one transparent substrate, a liquid crystal material comprising at least one nematic liquid crystal material disposed on the at least one substrate in association with a polymer matrix, wherein the liquid crystal material of the polymer matrix is switchable between a transparent state to a light scattering state by exposing the liquid crystal material to a predetermined temperature, and wherein the liquid crystal material is selected to allow switching to occur automatically upon being exposed to a predetermined temperature.

* * * * *